TEXTILE MATERIAL AND MANUFACTURE

Original Filed April 19, 1954 8 Sheets-Sheet 1

INVENTOR
HEINRICH MAUERSBERGER

TEXTILE MATERIAL AND MANUFACTURE

Original Filed April 19, 1954 8 Sheets-Sheet 2

INVENTOR
HEINRICH MAUERSBERGER

TEXTILE MATERIAL AND MANUFACTURE

Original Filed April 19, 1954 8 Sheets-Sheet 3

INVENTOR
HEINRICH MAUERSBERGER

TEXTILE MATERIAL AND MANUFACTURE

Original Filed April 19, 1954 8 Sheets-Sheet 4

INVENTOR
HEINRICH MAUERSBERGER

INVENTOR
HEINRICH MAUERSBERGER

INVENTOR
HEINRICH MAUERSBERGER

TEXTILE MATERIAL AND MANUFACTURE

Original Filed April 19, 1954 8 Sheets-Sheet 7

TEXTILE MATERIAL AND MANUFACTURE

Original Filed April 19, 1954 8 Sheets-Sheet 8

INVENTOR
HEINRICH MAUERSBERGER

United States Patent Office

Re. 25,749
Reissued Mar. 23, 1965

25,749

TEXTILE MATERIAL AND MANUFACTURE

Heinrich Mauersberger, Limbach-Oberfrohna, Germany, assignor, by mesne assignments, to VEB Nahwirkmaschinenbau Malimo Karl-Marx-Stadt, a corporation of Germany Original No. 3,030,786, dated Apr. 24, 1962, Ser. No. 771,696, Oct. 20, 1958, which is a division of Ser. No. 424,217, Apr. 19, 1954, now Patent No. 2,890,579, dated June 16, 1959. Application for reissue Apr. 15, 1964, Ser. No. 372,442
20 Claims. (Cl. 66—84)

Matter enclosed in heavy brackets [ ] appears in the original patent but forms no part of this reissue specification; matter printed in italics indicates the additions made by reissue.

My invention relates to [a novel] textile [material as well as to methods of and] machinery for producing [the same] *a novel textile material.*

This application is a division of application S.N. 424,217, filed April 19, 1954, now Patent No. 2,890,579.

[It is an object of the invention to produce a warp-knitted textile fabric within less manufacturing time and hence at lower costs than has been possible by means of known weaving, knitting or braiding methods and machines.]

[Another object of the invention is to produce such a textile fabric either from cheaper material or by a cheaper manufacturing method or both.]

[To achieve these objects, and in accordance with one of the features of the invention, a textile web or fabric is produced.] *In accordance with one of the major features of the invention, there is provided a textile machine for producing a novel textile web or fabric* by effectively sewing an area pattern of chain stitches into a layer of loose filling material, such as a matting or array of loose filling threads or a layer of wadding, preferably in such a manner that the stitching yarns or warp threads are interlinked to form a meshwork or knitted structure. The term "sewing" is used herein to indicate that the loose filling material is fed to the knitting location *of the machine* in such a manner that the operating speed of the knitting needles is in no way limited by, or required to be synchronized with, the rate of feed of the filling material.

[This method results in] *The inventive machine is adapted to produce* a textile fabric that derives its coherence, tensile strength and durability from the fact that the originally loose material, forming the bulk and body of the fabric, is bound or enmeshed within the loops of a multitude of chain stitched warp threads.

The use of chain-stitched rows of loops formed by a sewing operation-simulating warp knitting machine has the advantage that the yarn can be unwound from fixed spindles. Consequently the production of the new material is not hampered by the frequent interruptions which are necessary for changing the bobbin when working with conventional sewing machines, or for the change of spools when working with a loom. This is particularly important because in accordance with the present invention the speed of producing the new fabric is rendered almost equal to generally attainable sewing speeds and the stitches are relatively large.

The needles used for the stitching and intermeshing operation must be suitable for piercing the layers of loose filling threads or wadding and must act in synchronism with a yarn feeding device that supplies the stitching or warp yarn to the needles and must be capable of supplying a multitude of needles with a corresponding number of yarn threads in close juxtaposition to one another. Moreover, the needles must be sharp-pointed enough even to pierce the individual filling threads should they encounter the same during a stitching operation.

According to another feature of the invention, for binding loose threads by means of chain stitching into a fabric [I provide] *the invention provides a textile machine comprising* a device which places a group of threads within one plane in a zigzag design and, at the turning points of the zigzag lines, hangs the threads onto conveyor means whose purpose it is to guide the loose thread system through the machine and past the operating range of the needles.

These and other features of my invention as well as further objects and advantages will be apparent from, and will be referred to in, the following description in conjunction with the embodiments of the invention exemplified by the drawings in which.

*The inventive warp-knitting machine will now be described with reference to FIGS. 1 to 5 and 10 to 12, as follows:*

Figure 1:
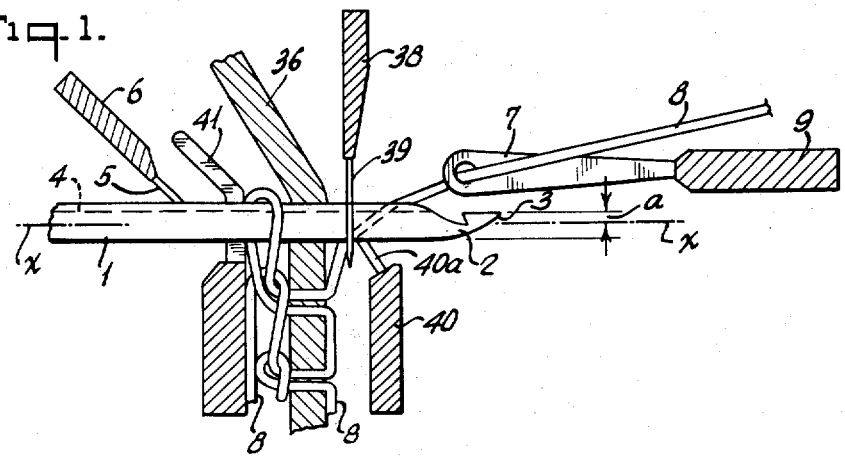
FIGS. 1 and 2 are side elevations of [the] *a* loop-forming device, *forming part of the novel textile machine according to the invention,* for stitching a layer of loose fiber wadding.

Referring more particularly to FIGS. 1 to 5, the implements shown there are suitable for producing chain-stitched rows of warp thread loops which, if desired, can be joined together in the manner of a knitted fabric. These implements comprise knitting needles 1, each having a fixed hook 2 like a crochet needle and, at the front end, a sharp point 3 like that of a sewing needle. However, the point 3 is not within the longitudinal center axis x of the needle, but is off center in the plane of the hook by a distance a, as shown in FIG. 1 toward the open side of the hook. The needle shank is flattened transverse to the plane of the hook, in such a manner that the cross-section of the needle 1 is of approximately ellipsoidal shape. These needles are fastened in holders, either close together or with a larger space between them, and the needle holders are fastened to a needle bar, unless the holders are integral parts of the needle bar.

*The needle points pass through a layer of fibers forming a base material and are capable of piercing some of the encountered filling threads.*

To close the hook 2 of the needle 1 and to securely retain a thread inserted within the bight of the hook, the shank of the needle is provided with a groove 4 to slidingly accommodate a sufficient length of a wire or strip slide 5 which is fastened to a bracket 6 attached to suitable reciprocating means.

Operated in synchronism with the loop-forming knitting needles are thread guides 7 which are supplied with the stitching yarn or warp thread 8 and serve to insert the yarn into the hooks 2 of the needles 1. Holders 9 of the thread guides 7 are fastened to a guide bar and, for the just-mentioned purpose, are effectively revolved at the proper time about the axes of the needles 1.

Figure 4:
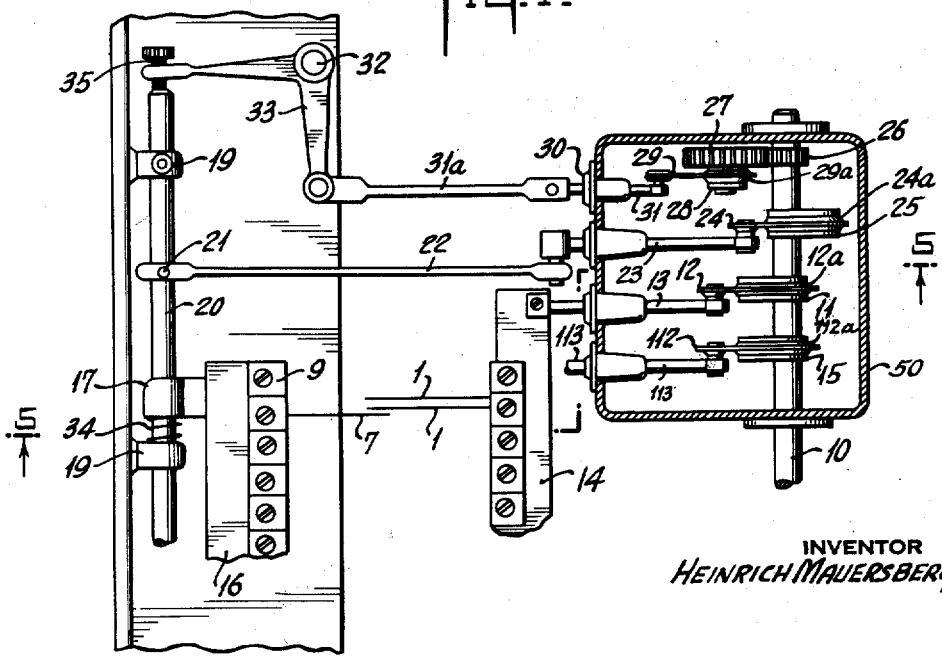
FIG. 4 is a plan view of the drive for the loop-forming knitting needles and the thread guides.

For the rapid machine operation, it is advisable to use circular eccentric cams for actuating the needles and the thread guides. As shown in FIG. 4, a needle bar 14 carrying the needles 1 is actuated by a connecting rod 13 extending from an eccentric rod 12 linked to a strap 12a of an eccentric cam 11 which is rotated by [the] *a* motor driven shaft 10 supported by a housing 50. Similarly, the reciprocating movement of the slides 5, required for closing the hooks of the needles 1, is obtained by means of an eccentric cam 15 cooperating with a trap 112a actuating through an eccentric rod 112, a connecting rod 113 that actuates the brackets 6 to which the slides 5 are attached through a cam. The holders 9 of the thread guides 7 are fastened to a guide bar 16 which, by means of suitably attached lever arms 17, is fixedly mounted on a shaft 20. This shaft, being rotatably mounted within bearings 19, is adapted to slide longitudinally back and forth and carries a short lever 21.

Figure 3:
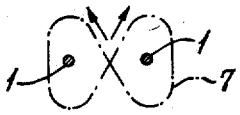
FIG. 3 shows the motion of a thread guide about two loop-forming knitting needles *in the same textile machine*.
Figure 5:
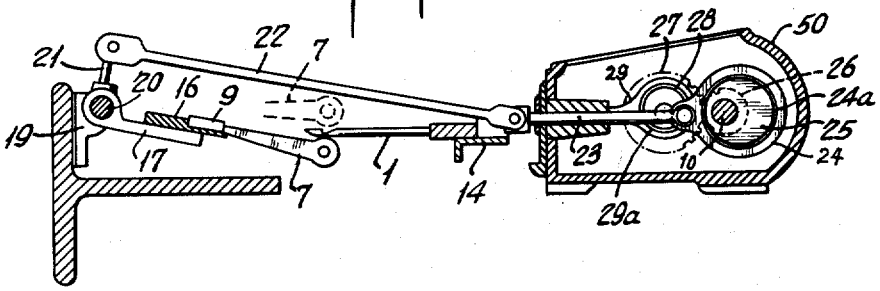
FIG. 5 is a partial sectional view of the drive shown in FIG. 4 taken along line 5—5.

Lever 21 is connected with a coupling rod 22 linked to an eccentric rod 24. Rod 24 with its strap 24a encloses the eccentric cam 25 which, by means of an intermediate connecting rod 23, moves the thread guides up and down. Aside from this reciprocating movement, the thread guides must undergo an axially transverse back and forth movement in order to insert threads into the hooks of the needles 1. As shown in FIG. 3, the path of the thread guides 7 appears from above as a prone figure eight.

I have found it advantageous to let each of the thread guides circle around two adjacently mounted knitting needles 1 and to cause each thread guide to alternately supply two knitting needles with yarn, each time at the moment when one of the needles has reached its foremost position and the thread guide has passed the highest point of its upward movement. For this purpose, the thread guides 7 and the shaft 20 carrying the same are operated to perform one complete back and forth movement while the needles 1 are moved twice back and forth. To accomplish this, a pinion 26 keyed to the shaft 10 engages a spur wheel 27 of twice its size. Consequently, the spur wheel rotates at one half of the speed of shaft 10.

Spur wheel 27 is fixedly connected with an eccentric cam 28 whose strap member 29a is linked by an eccentric rod 29 to a connecting rod 31 axially slidable in a bearing 30. When in operation, the rod 31 and its linkage 31a impart axial reciprocations to the shaft 20 by actuating an angle lever 33 rotatably mounted on a pivot 32. A tension spring 34 fastened about the shaft 20 between one of the bearings 19 and the adjacent lever arm 17 of the guide bar 16 aids the axially oscillating movement by forcing the shaft against an adjusting screw 35 connecting the free end of angle lever 33 to that of shaft 20.

Figure 2:
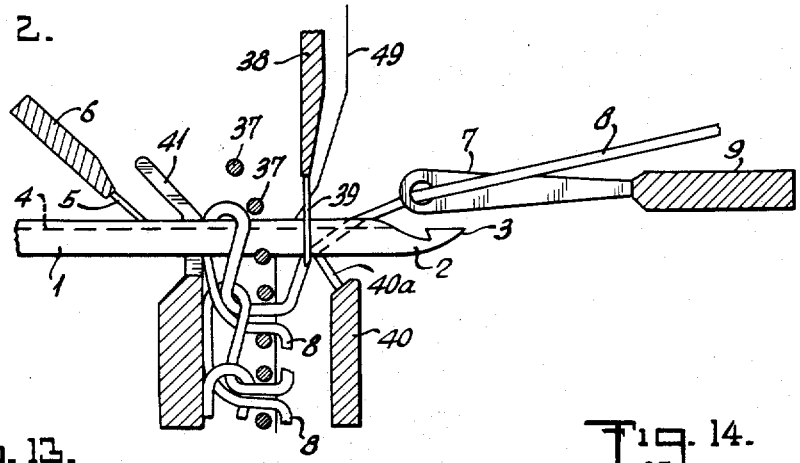

For producing the textile fabric as shown in FIG. 1 the needles 1 are made to pierce a layer 36 of textile fibers, such as cotton wadding or upholstery stuffing. However, as indicated in FIG. 2, the material may also be a system of loose fibers 37 that are either piled together at random distribution or are processed into a loose textile fabric. Alternatively the system may comprise several layers of wadding with loose textile fibers placed therebetween. To prevent the layer of material from dodging the needles, a comb-like structure is arranged in back of the material. This structure consists of a bracket 38 containing a row of needles or tines 39 which point downward and are arranged so as to permit the needles 1 to penetrate between adjacent tines. Opposite thereto is a similar comb-structure 40, the tines 40a of which point in an upward direction. The structures 38 and 40 are mounted so as to leave a narrow space between opposite tines to permit an unobstructed passage of the loops formed by the threads of yarn 8, together with the material and to permit each thread guide 7 to alternately supply its yarn 8 to a different needle 1.

After the yarn 8 is placed into the hooks 2 of needles 1 and has been formed into loops, the needles 1 are withdrawn from the material together with the loops. During this stage of operation the material being stitched must be held in position by a suitable support. This support may consist of a bracket 41 of a construction similar to that of the bracket 38, or it may consist of a perforated metal sheet. To facilitate the insertion of material at the beginning of the operation, the upper margin of the support 41 is preferably bent so as to enlarge the opening between the two brackets.

Figure 6:
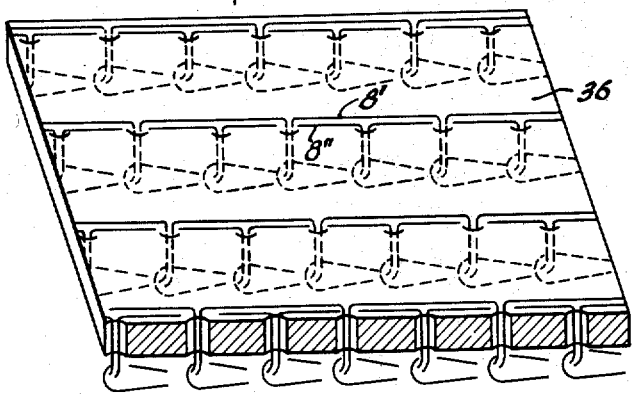
FIGS. 6 to 9 illustrate different types of the new textile material *made with the inventive textile machine*.

The aforedescribed device is suitable for producing different kinds of warp loop chains. The simplest way is to guide the layer 36, for example a layer of cotton, through a device of this kind comprising a plurality of needles 1 spaced more or less far apart from each other, whereby each needle 1 produces a separate loop chain and the layer 36 is bound and made coherent by a corresponding number of parallel loop chains. To prevent ripping of the chain in case a loop is damaged or destroyed, it is advisable to provide two thread guides 7 for every needle 1 and to supply each thread guide with a separate thread of yarn. The yarn for the two thread guides 7 can then be inserted alternately into the hooks 2 of the respective needle 1, so that, as illustrated in FIG. 6, the chains consist of alternating threads 8′ and 8″. In such a chain, the thread which does not form a loop at a particular point, loosely passes over this point at which the other thread pierces the layer 36.

Figure 7:
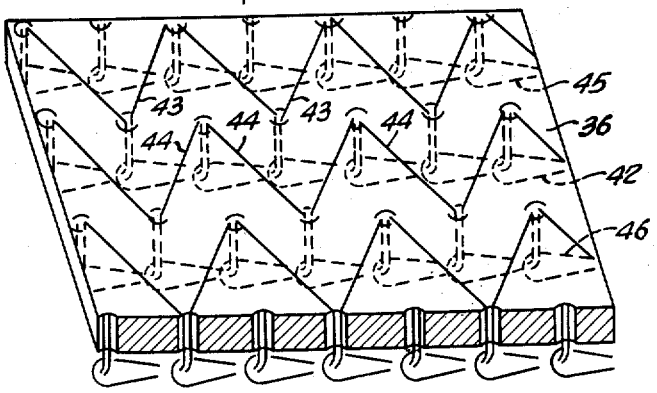

FIG. 7 shows another piece of fabric produced with warp chains made from two different, alternating threads of yarn, such as a chain 42 consisting of threads 43 and 44. In this material, however, each of the two threads forms alternately the loops of two different chains, although they do not require the arrangement of two thread guides for every sewing needle 1, because the thread 43 forms the loops of the chains 42 and 45 while the thread 44 forms the loops of the chains 42 and 46. Consequently, the threads 43 and 44 lie in a zigzag line on top of the fibrous layer 36. The chains 42, 45 and 46 are thereby joined with each other as in a tricot-stitched fabric, from which the herein-described material however differs in having a layer of cotton or the like incorporated within the meshwork.

Figure 8:
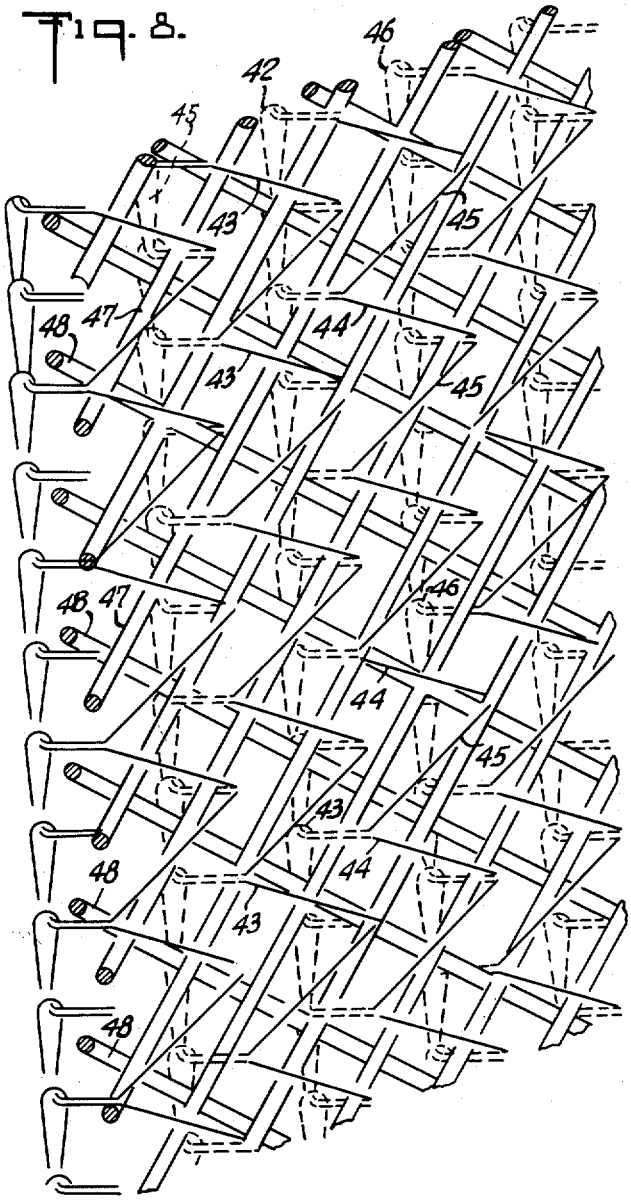
Figure 9:
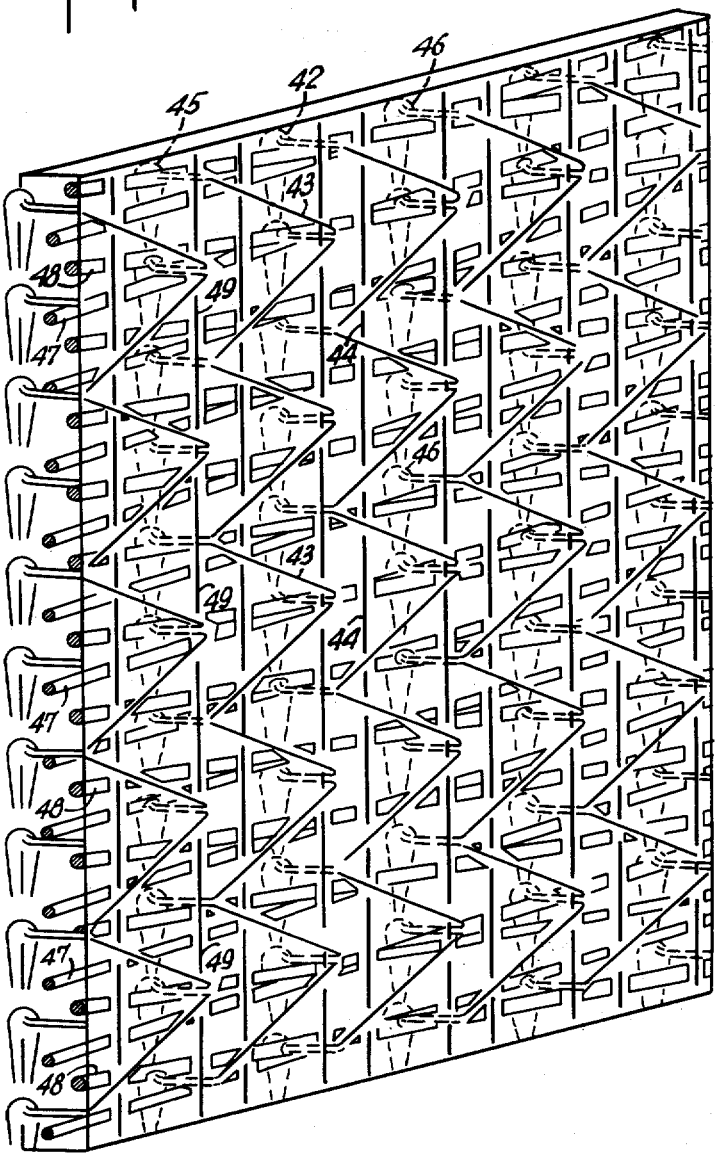

The loop chains shown in FIGS. 8 and 9 are made in a similar manner. Here the loops of each of the chains 42, 45 and 46 consist of two alternately different threads, whereby each of the threads in turn forms the loops of two adjacent chains. However, in this instance the purpose of these chains is not to bind a layer of cotton wadding, but to integrate into a durable textile fabric two systems of loose filling strands which cross each other. Strands 47 are superimposed upon a strand system 48, without being interwoven therewith or interlaced in any way. According to FIG. 8 the filling strands or threads cross each other at right angles; according to FIG. 9 they cross at an acute angle. In addition to the strand systems 47 and 48 which run obliquely to the chains 42, 45 and 46, the material according to FIG. 9 comprises additional threads 49, running parallel to the chains 42, 45 and 46 in the longitudinal direction of the fabric.

Figure 10:
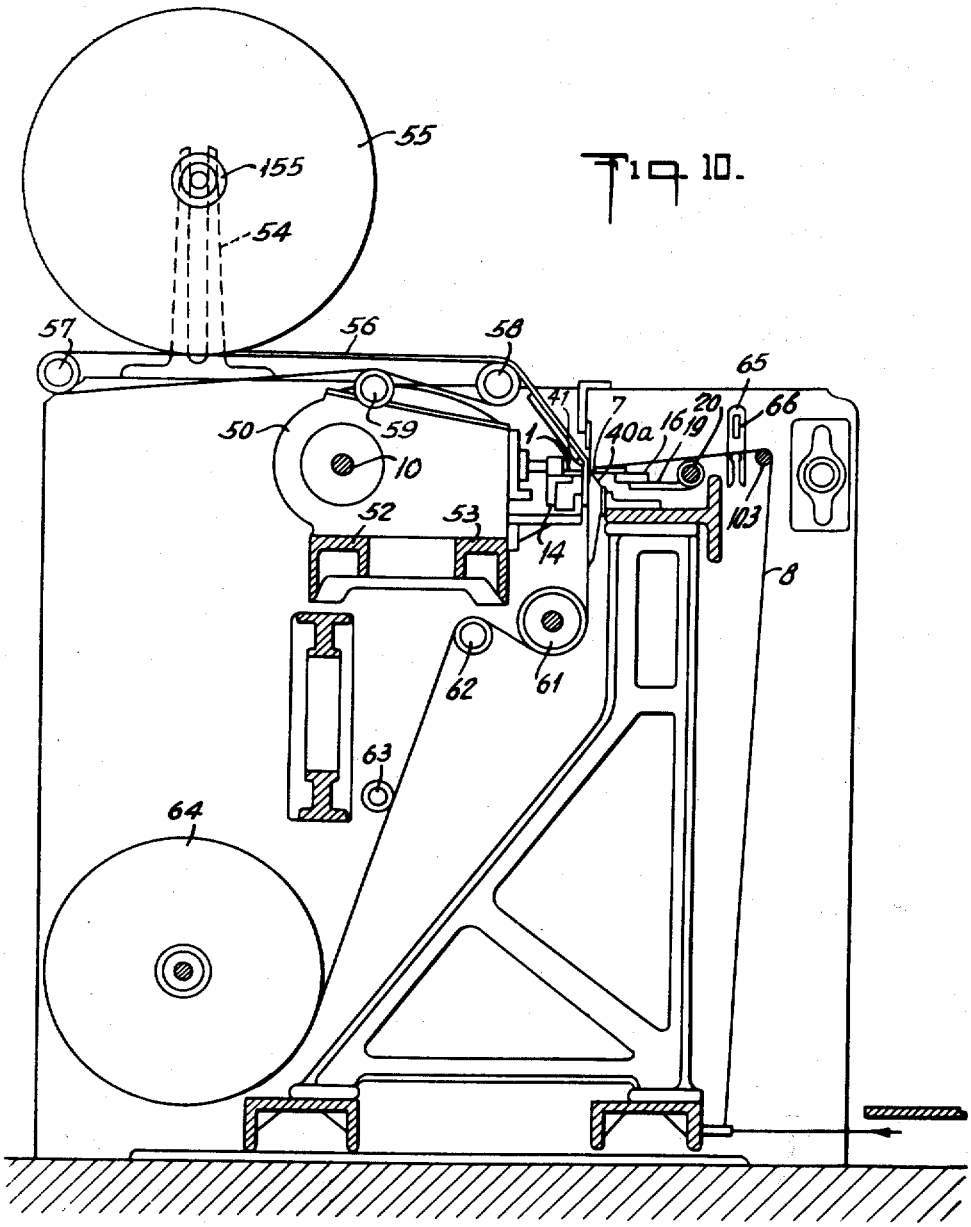
FIGS. 10 and 11 are comprehensive views of the arrangement of [a warp knitting] *the inventive textile* machine for producing textile fabrics of the type shown in FIGS. 6 and 9, respectively.

A device as illustrated in FIG. 10 can be used for making textile material according to the invention from cotton wadding, fleece or superimposed layers of carded material. The loop-forming elements of the device are denoted by the same reference numerals as the respective parts illustrated in FIGS. 1 to 5 and described above. The eccentric drive of the loop-forming elements is enclosed by the housing 50 mounted on longitudinal beams 52 and 53 which also connect sides 51 of the machine-frame structure with each other. Fastened to each of the sides 51 is a guide frame 54 to retain, within vertical slots thereof, a shaft 155 of a warp beam 55 for the cotton supply. The rim of this warp beam rests on a conveyor belt 56 which passes about rolls 57 and 58. One of these rolls serves as the driving roll, while a separate roll 59 is provided to keep the belt under tension.

The matted material, being unwound from the warp beam, is carried over the roll 58 and over a guide sheet 60 past the sharp-pointed knitting or loop-forming needles 1 where it is interspersed with loop chains of the type found in a tricot knitting. The required warp threads 8 are supplied from a suitably located creel or yarn beam and, by means of the thread guides 7, are inserted into the hooks of the sharp-pointed needles 1. The path travelled by the threads from the yarn tensioning device to the thread guides 7 should be of sufficient length to secure for the threads the amount of elasticity required for eliminating the necessity of a resiliently yielding tensioning rod. If needed, riders, such as rider 65 held by a rail 66 removably attached to the frame of the device, may be set upon the threads passing from a guide rail 103 which is fixedly mounted within the frame.

The durable textile fabric into which the matted material is converted by the action of the needles 1 is then transferred, over guide rollers 61, 62 and 63, to a winding beam 64.

Figure 11:
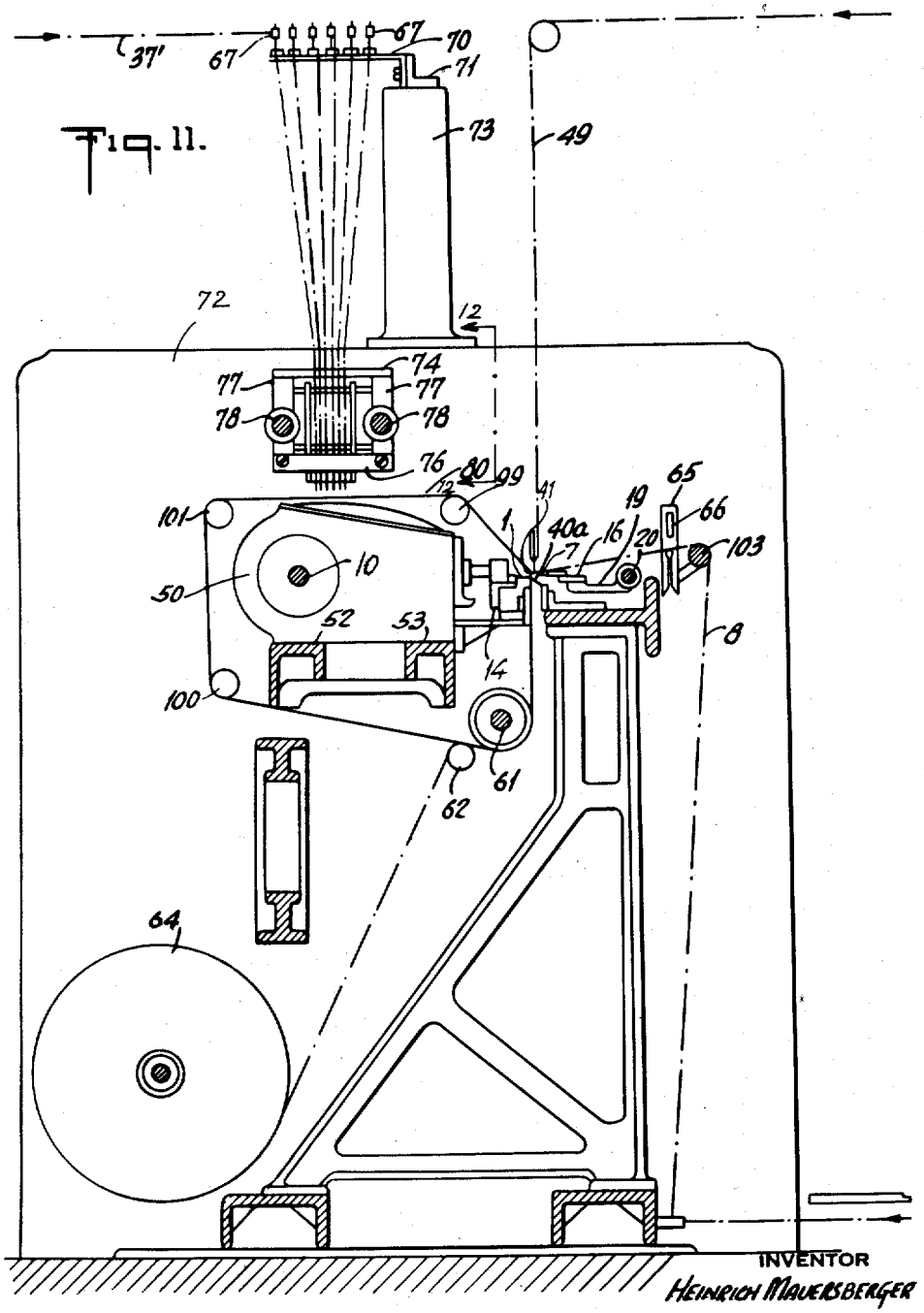
Figure 12:
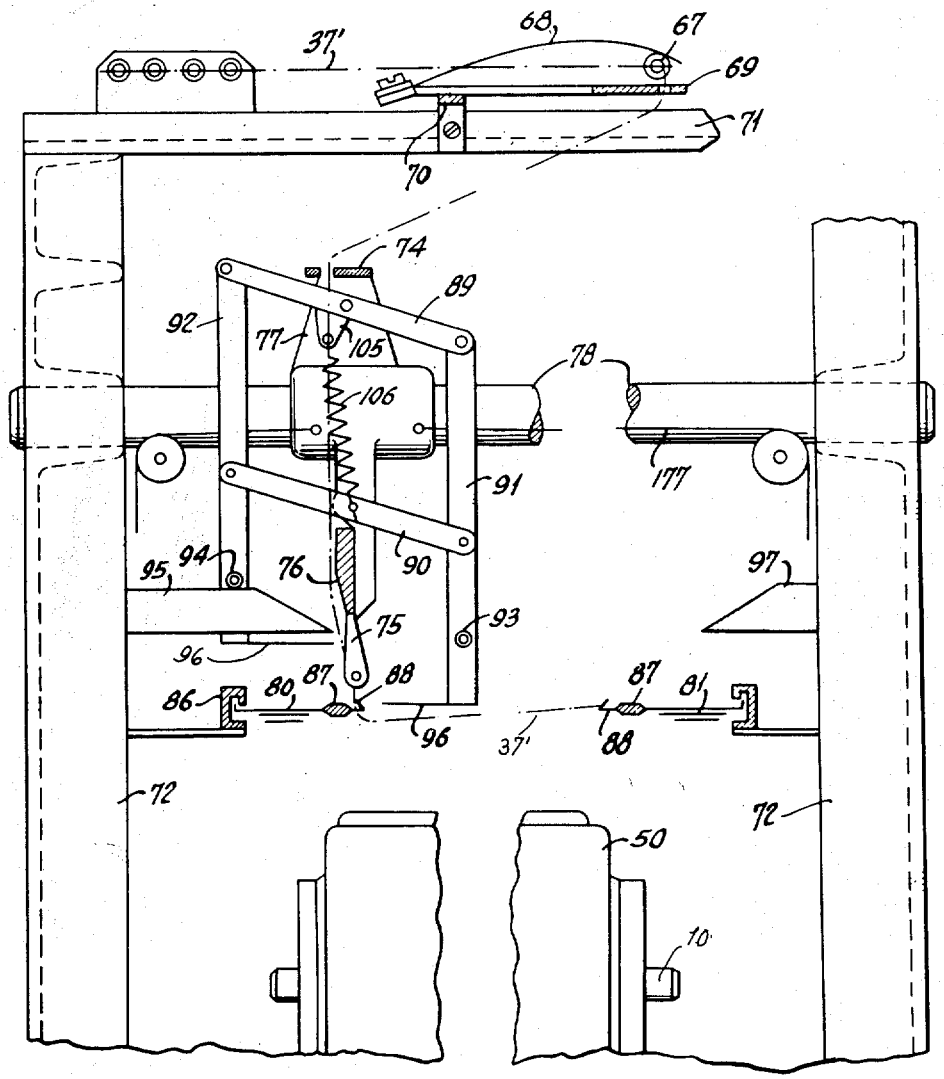
FIG. 12 is a side elevation of the filling thread laying device, *taken along line 12—12 of FIG. 11*.

Similar to the afore-described chain-stitching of cotton layers, the device shown in FIGS. 11 and 12 may be used for the conversion of systems of overcrossing strands into textile fabrics of the type shown in FIGS. 8 and 9. However, the device requires auxiliary means for the sleaving of the overcrossing strands and for transferring them to the loop-forming elements.

According to the present invention, the loose filling strand systems 47 and 48 of FIGS. 8 and 9 to be integrated in the herein described manner, are made up of the threads 37'. These threads are unwound from reels or from a warp beam and are fed to a group of thread carriers 67. The carriers 67, together with individual leaf springs 68 (see FIG. 12), an inflexible guide sheet 69 and brackets 70, are secured by an angle iron 71 to two standards 73 mounted on respective side walls 72 of the machine frame directly above the housing 50 for the eccentric drive mechanisms. From thread carriers 67 the threads 37' pass through respective perforations of a guide rail 74 and thence to a suitably dimensioned row of thread guides 75 fastened to a bracket 76 and aligned perpendicularly to the row of knitting needles 1. The guide rail and the bracket are fastened to two standards 77, each slidingly fastened to a slide bar 78. The guide rail 74, the bracket 76 and the standards 77 represent a rigid frame structure or carriage which is moved back and forth along the two slide bars 78 by means of a rope 177 actuated by a drive mechanism (not shown) located within the lowest part of the machine.

Figure 13:
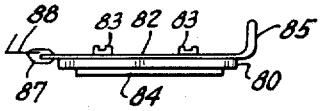
FIGS. 13 to 15 represent side-, front- and plan-views of the manner in which thread holding hooks are attached to the conveyor belts of the advancing means for the loose filling thread system.
Figure 14:
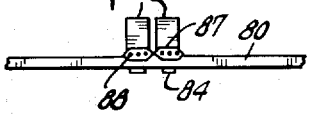
Figure 15:
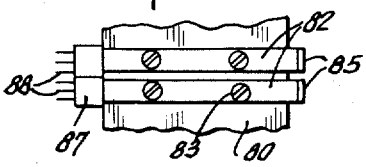

Upon reaching either one of its end positions, the carriage 74—76—77 brings the threads 37' alternately to two conveyor belts 80 and 81, which may be made from belting, webbing, steel straps, chains, etc. As indicated in FIGS. 13 to 15, each of these conveyor belts comprises closely arranged lateral metal strips 82 fastened to the conveyor belt by screws 83. The ends of the screws are threaded into a narrow metal strip 84 thus fastening the strip to the underside of the conveyor belt. In this manner the metal strips 82 can be easily exchanged.

The outside ends of strips 84 are bent at 85 to fit into slotted guide rails 86 which absorb the pull exerted by the threads 37' in the direction of the metal strips 82 and thus prevent a deflection of the conveyor belts 80 and 82. Moreover, the rails 86 are adapted to increase the distance between the conveyor belts within the operating range of the needles 1, in order to impart tension to the threads 37' held by the conveyor belts and to thereby facilitate the stitching of uniform loop chains.

At the point where the finished goods are removed, the rails 86 converge somewhat to bring the conveyor belts in closer proximity, in order to facilitate the removal of the threads 37' from the conveyor belts. The inside end of each metal strip carries several heddle-hooks 88, fastened thereto by means of cast leaden sleeves 87. The hooks point in an upward direction. The distance between adjacent hooks 88 should differ as little as possible from the distance between adjacent thread guides 75. The latter guide the threads 37' in such a manner as to insert them into the hooks 88 at the moment when the thread guides reverse their movement. This procedure is facilitated by the fact, that during the reciprocating movement of the thread guides 75, the conveyor belts 80 and 81 are moving parallel to the row of thread guides. As a result, during the reversal of the reciprocating movement, the threads arrange themselves transversely about the hooks.

The movements of the conveyor belts 80 and 81 and of the thread guides 75 must be synchronized in such a manner, that each thread 37' engages only one of the hooks 88. Another requirement is that during one complete back and forth movement of the thread guides 75 the conveyor belts 80 and 81 proceed a distance exactly equal to the length of the row of the thread guides 75 so as to attain an uninterrupted succession of groups of threads which attach themselves to the rows of hooks 88 and, thereupon, form a dense thread structure that, because of the reciprocating movement of the thread guides 75, consists of two rows of threads crossing each other. The angle at which these two rows of threads cross each other depends upon the length of the row of thread guides 75 in relation to the distance between the opposite heddle hooks of the two conveyor belts 80 and 81. Thus, if the row of thread guides is equal in length to the distance between the conveyor belts 80 and 81, the two rows of thread cross each other at an angle of 60°. The angle becomes larger with an increase in the relative length of the row of thread guides. In the case of a relatively short row of thread guides 75, the angle becomes more acute. This explains the difference in the crossing angle between the thread systems 47 and 48 in FIGS. 8 and 9, respectively.

To insure a faultless insertion of the threads 37' into the hooks 88, the threads must be brought below the plane of the hooks at the end of each back and forth movement. For this purpose, two parallel two-armed levers 89 and 90 are mounted on each of the standards 77. The levers are rockably supported to swing about fulcrums at their centers. A spring 106 fastened between the lever 90 and an eyelet 105 of the lever 89 tends to retain the two levers in a horizontal position. The levers are articulated to and connected with each other by means of vertical rods 91 and 92 which remain parallel during the swinging movement.

Two rollers 93 and 94 are journalled to the free ends of the rods 91 and 92, respectively. Two cam rails 95 and 97 extend from the machine frame side walls 72 into the path of the respective rollers 93, 94. Rail 95 is so shaped that the roller 94 rises along an inclined edge of the rail shortly before the thread guides 75 move over the hooks 88 of the conveyor belt 80. The rod 92 is thereby raised while the rod 91 is lowered correspondingly. Pressure blades, such as pressure blade 96, are fastened to the lower ends of the rods. The free ends of these blades are slightly longer than the row of hooks 88 so that, at the terminal positions of the thread guides 75, the blades reach below the hooks 88. By means of this arrangement, the threads 37' are pressed into the intervals between the hooks in order to assure the take-up of the threads by the hooks as the conveyor belts move along.

The longitudinally running warp threads 49 shown in FIG. 9 are taken off a separate warp beam and are loosely laid on top of the threads 37' held by the conveyor belts 80 and 81. If desired, a special, fixedly mounted row of thread guides may be provided for the threads 49 near the loop-forming means 1 and 7, or the tines 39 of the detainer bracket 38 may be replaced by thread guides.

The two conveyor belts 80 and 81 are endless belts, mounted to pass around idling pulleys 99, 100, 101 and the driving pulley 61. The idling roller 99 and the driving pulley 61 extend over the entire width of the textile fabric to be produced and prevent sagging of the latter. As a result the device secures a faultless movement of the material across the guide sheet 41 toward the loop-forming needles 1 which, together with the thread guides 7 supplying the warp thread 8, provide the material with the desired interlinked loop chains.

While I have described what I consider to be preferred embodiments of the methods, devices and products of my invention, it is obvious that many changes can be made without departing from the invention. Therefore, I do not limit myself to the exact forms herein shown and described nor to anything less than the whole of my invention as hereinbefore set forth, and as hereinafter claimed.

I claim:

1. In a warp knitting machine for producing a textile fabric composed of a system of loose filling threads and chains of warp thread loops enmeshing and interconnecting said filling threads, said machine having a row of [sharp-pointed] knitting needles *having points sufficiently sharp to pierce some of said filling threads in the fabric,* and first drive means to operate said knitting needles; a pair of laterally spaced, substantially parallel endless conveyor belts running in a direction substantially perpendicular to said row of knitting needles, said conveyor belts being provided at their adjacent edges with respective sets of holding elements adapted for engagement by said filling threads, a carriage reciprocally movable above said conveyor belts from one of the same to the other in a direction parallel to said row of knitting needles, a plurality of thread guides supported by said carriage and aligned in a row which extends perpendicular to said row of knitting needles and parallel to the longitudinal axes of said knitting needles, means for reciprocating said carriage, and second drive means connected to said conveyor belts and operated to drive the latter continuously and in synchronism with one another and said carriage so as to ensure that said filling threads are alternately laid about respective ones of said holding elements first on one belt and then on the other as said carriage comes to the reversal points of its reciprocal movements adjacent the respective belts, said filling threads thereby being formed into a multi-layer system of superimposed and intersecting zigzag thread stretches and fed as a unit toward said row of knitting needles by said conveyor belts so as to be enmeshed by said warp thread loops while still retained by said holding elements of said conveyor belts, there being no *synchronizing* operable connection between said first and second drive means, to permit the running speed of said conveyor belts and thus the feed rate of said filling thread system to be adjusted and set independently of and without any limiting effect on the operating speed of said knitting needles, whereby the enmeshing of said filling threads by said warp thread loops can be effected in [a random] *such a* manner *as to enable the length of said warp thread loops to be varied.*

2. In a machine according to claim 1, a pair of guide rails fixedly positioned adjacent the remote edges of said conveyor belts, and a plurality of guide elements carried by said conveyor belts at said remote edges thereof and slidably engageable with said guide rails, the spacing between said rails at a location opposite and coextensive with said knitting needles being sufficiently large to impart tension to the stretches of said filling thread extending between said holding elements, and the spacing between said rails at a location following the location of said knitting needles being somewhat less than the first-mentioned spacing to reduce the tension on said filling thread stretches and permit discharge of the finished fabric from said holding elements of said conveyor belts.

3. In a machine according to claim 2, a plurality of presser blades supported by said carriage for movement therewith and for reciprocal displacement vertically toward and away from said conveyor belts and operable when lowered to press those sections of said filling thread stretches adjacent said holding elements firmly into the spaces between the latter.

4. In a machine according to claim 3, a pair of parallel levers mounted on said carriage for pivotal movement intermediate their respective ends, a pair of link rods each articulated to one of the free ends of each of said levers, said presser blades being supported by said link rods, respectively, and resilient means operatively connected to said levers for retaining the same and thus said presser blades in balanced and inoperative positions during movement of said carriage between said conveyor belts.

5. In a machine according to claim 3, a pair of parallel levers mounted on said carriage one above the other for pivotal movement intermediate their respective ends, a pair of link rods each articulated to one of the free ends of each of said levers, said presser blades being supported by said link rods, respectively, camming means engageable with said link rods when said carriage comes to said reversal points of the movements thereof to displace the respective one of said rods in such a manner as to lower the associated one of said presser blades into operative relationship to the corresponding conveyor belt, and resilient means operatively connected to said levers for retaining the same and thus said presser blades in balanced and inoperative positions during movement of said carriage between said conveyor belts.

6. In a machine according to claim 5, said levers and said link rods being arranged in the form of a parallelogram with said link rods extending below the lower one of said levers, a pair of rollers each carried by a respective one of said link rods, said camming means comprising a pair of cam rails positioned adjacent said conveyor belts and each having a cam surface which is adapted to be engaged by the associated one of said rollers as said carriage approaches the corresponding one of said reversal points of the movements thereof and along which the associated one of said rollers is adapted to move to raise the corresponding one of said link rods and thereby to concurrently lower the other link rod.

7. In a machine according to claim 6, the points of said knitting needles being offset in the plane of and toward the open side of the needle hooks with respect to the respective longitudinal axes of said knitting needles.

8. In a machine according to claim 7, a plurality of comb-shaped means mounted adjacent the location of said knitting needles and securing said filling threads against transverse movement with said knitting needles in the axial direction of the latter.

9. In a machine according to claim 8, a plurality of additional thread guides for laying said warp thread onto said knitting needles, a first eccentric driver for reciprocating said additional thread guides in a direction parallel to said row of knitting needles, and a second eccentric driver for reciprocating said additional thread guides in a vertical direction relative to said row of knitting needles.

10. In a machine according to claim 9, means operatively connected to said first and second eccentric drivers for operating the same in synchronism to ensure that said first driver reciprocates each of said additional thread guides past two adjacent ones of said knitting needles and parallel to the row of the latter performs one complete rotation while concurrently said second driver which reciprocates each of said additional thread guides vertically relative to said row of knitting needles performs two complete rotations.

11. In a machine according to claim 10, means arranged adjacent said knitting needles for feeding and guiding to the knitting location loose warpwise filling threads to be enmeshed with the first named filling threads.

*12. In a warp knitting machine for producing a textile fabric composed of a system of loose filling threads and chains of warp thread loops enmeshing and interconnecting said filling threads, said machine having a row of knitting needles, first drive means to operate said knitting needles, a pair of laterally spaced, substantially parallel endless conveyor belts running in a direction substantially perpendicular to said row of knitting needles, said conveyor belts being provided at their adjacent edges with respective sets of holding elements adapted for engagement by said filling threads, a carriage reciprocally movable above said conveyor belts from one to the other in a direction parallel to said row of knitting needles, a plurality of thread guides supported by said carriage and aligned in a row which extends perpendicular to said row of knitting needles and parallel to the longitudinal axes of said knitting needles, means for reciprocating said carriage, and second drive means connected to said conveyor belts and operated to drive the latter continuously and in synchronism with one another and said carriage so as to ensure that said filling threads are alternately laid about respective ones of said holding elements first on one belt and then on the other as said carriage comes to the reversal points of its reciprocal movements adjacent the respective belts, said filling threads thereby being formed in a multi-layer system of superimposed and intersecting zigzag thread stretches and fed as a unit toward said row of knitting needles by said conveyor belts so as to be enmeshed by said warp thread loops while still retained by said holding elements of said conveyor belts, said conveyor belts and said carriage cooperating when moving to present said filling threads aslant to said row of knitting needles, said first drive means, because of said aslant presentation of said filling threads, causing any one of the latter threads to be engaged progressively by different ones of said knitting needles at spaced points along its length from one of said conveyor belts across the other belt during successive operations of said knitting needles by said first drive means as said second drive means drives said conveyor belts and said carriage, to avoid subjecting each of said filling threads to the simultaneous action of all of said knitting needles.*

*13. In a textile machine of the class described for producing a fabric having chain warps and a plurality of filling threads, the combination comprising a row of needles, means to reciprocate said needles so as to knit said chain warps, two spaced sets of filling-thread holding elements, means to move said elements toward said row of needles, filling-thread control means reciprocating transversely of said chain warps and parallel to said row of needles, said control means being effective to deposit each of said filling threads alternately on each of said sets of elements, said moving means and said control means cooperating to cause said filling threads to move toward said row of needles diagonally disposed relatively thereto, said needles being effective, due to said diagonal disposition, to knit said chain warps around said filling threads at points progressively arranged from one of said sets of elements to the other set along said filling threads during successive reciprocations of said needles and continued movement of said moving means, to the end of avoiding subjecting any filling thread to the simultaneous action of all of said needles.*

*14. In a textile machine, the combination according to claim 13, wherein each of said filling threads is continuous and said control means requires each filling thread to extend back and forth between, and is connected to, said holding elements of both sets.*

*15. In a textile machine, the combination according to claim 13, wherein said elements of each set, which are simultaneously engaged with all the filling threads, are disposed at right angles to said row of needles.*

*16. In a textile machine, the combination according to claim 13, wherein said control means requires each of said filling threads to be normally held at two spaced points by said elements.*

*17. In a textile machine, the combination according to claim 13, further comprising two thread guides and two threads for each of said needles, and means to cause said needles to bind said filling threads together by separate loop chains, in each of which the threads are looped in such manner that the loops formed in one of the threads of a needle alternate with the loops formed in the other thread of the needle.*

*18. In a textile machine, the combination according to claim 17, wherein each of said needles has a hook, and further comprising a mechanism causing said thread guides to place their threads alternately into said hooks of the corresponding needles.*

*19. A machine of the class described for processing chain warps and a plurality of filling threads, comprising a pair of spaced conveyor belts, filling-thread holding elements on each belt, a row of needles to knit said chain warps, filling-thread control means to move said filling threads back and forth between said elements, driving means to move said belts simultaneously to advance said filling threads to said needles, said control means and said driving means cooperating to dispose said filling threads diagonally with respect to said needles, and means to reciprocate said needles and cause them to knit said chain warps around said filling threads, due to the diagonal disposition of the latter, at points which progressively move along said filling threads from one of said belts to the other belt during succesisve reciprocations of said needles and continued movement of said belts, to the end of avoiding subjecting any one of said filling threads to the simultaneous action of all of said needles.*

*20. A machine according to claim 19, further comprising means to cause said belts to move away from each other so as to tension said filling threads as they approach said row of needles after said filling threads have been attached to said holding elements on said belts.*

References Cited by the Examiner

The following references, cited by the Examiner, are of record in the patented file of this patent or the original patent.

UNITED STATES PATENTS

| | | | |
|---|---|---|---|
| 246,248 | 8/81 | Upton | 66—84 |
| 302,810 | 7/84 | Young | 66—84 |
| 422,646 | 3/90 | Smith | 66—85 |
| 423,780 | 3/90 | Landenberger | 112—79.5 |
| 573,720 | 12/96 | Sumner | 66—192 |
| 1,531,548 | 3/25 | English | 66—84 |
| 1,661,055 | 2/28 | Springthorpe | 66—84 |
| 1,680,614 | 8/28 | Hill et al. | 66—84 |
| 1,816,416 | 7/31 | Willingham | 66—85 |
| 1,856,782 | 5/32 | Morton | 66—85 |
| 1,866,222 | 7/32 | Pledger | 66—120 |
| 1,895,293 | 1/33 | Morton | 66—85 |
| 2,000,643 | 5/35 | Morton | 66—85 |
| 2,005,951 | 6/35 | Morton | 66—85 |
| 2,136,368 | 11/38 | Amidon | 66—84 |
| 2,243,850 | 6/41 | Amidon | 66—84 |
| 2,297,440 | 9/42 | Szucs | 66—84 |
| 2,336,455 | 12/43 | Amidon | 66—84 |
| 2,400,524 | 5/46 | Amidon | 66—85 |
| 2,743,596 | 5/56 | Noe | 66—84 |

RUSSELL C. MADER, *Primary Examiner.*

DONALD W. PARKER, *Examiner.*